United States Patent [19]

Szablewski et al.

[11] Patent Number: 4,771,984

[45] Date of Patent: Sep. 20, 1988

[54] ELECTROMAGNETICALLY ACTUATABLE FUEL-INJECTION VALVE

[75] Inventors: Piotr Szablewski, Frankfurt am Main; Wolfgang Sauerschell, Oberursel, both of Fed. Rep. of Germany

[73] Assignee: VDO Adolf Schindling AG, Frankfurt am Main, Fed. Rep. of Germany

[21] Appl. No.: 9,272

[22] Filed: Jan. 30, 1987

[30] Foreign Application Priority Data

Jan. 31, 1986 [DE] Fed. Rep. of Germany ....... 3602956

[51] Int. Cl.⁴ .................... F16K 31/06; F02M 51/06
[52] U.S. Cl. ..................... 251/129.15; 251/129.18; 239/585; 239/533.11
[58] Field of Search ..................... 251/129.21, 129.22, 251/129.15, 129.18; 239/585, 533.11, 533.12

[56] References Cited

U.S. PATENT DOCUMENTS

| 3,429,552 | 2/1969 | Huley et al. | 251/129.18 X |
| 4,310,123 | 1/1982 | Tepastte | 251/129.15 X |
| 4,423,841 | 1/1984 | Palma | 251/129.15 X |
| 4,437,488 | 3/1984 | Taggart et al. | 251/129.18 X |
| 4,651,931 | 3/1987 | Hans et al. | 251/129.21 X |

FOREIGN PATENT DOCUMENTS

| 55992 | 2/1944 | Netherlands | 239/585 |
| 259023 | 10/1926 | United Kingdom | 239/533.12 |

*Primary Examiner*—Arnold Rosenthal
*Attorney, Agent, or Firm*—Martin A. Farber

[57] ABSTRACT

In a fuel-injection valve, an armature (7) having upper and lower guide surfaces (12, 13) is arranged within a valve housing (1). Via the upper guide surface (12), the armature (7) is guided in a guide borehole (15) of the valve housing (1) directly below the magnet winding (3) of the fuel-injection valve. In this way the losses of magnetic flux are very small.

7 Claims, 1 Drawing Sheet

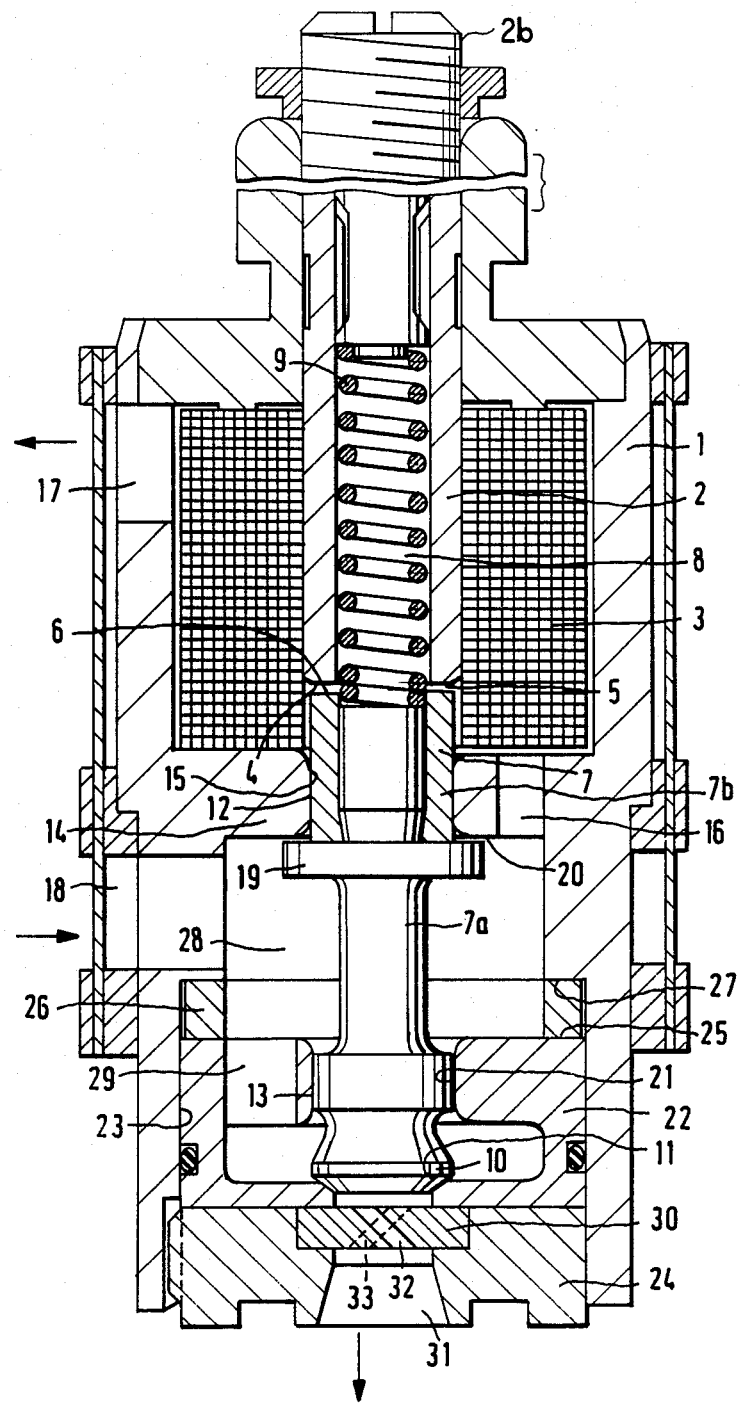

ELECTROMAGNETICALLY ACTUATABLE FUEL-INJECTION VALVE

FIELD AND BACKGROUND OF THE INVENTION

The present invention relates to an electromagnetically actuatable fuel-injection valve for injection systems of internal-combustion engines, having a valve housing, a soft-iron core which is arranged within the valve housing and surrounded by a fixed magnet winding, and an armature which is arranged coaxially with and facing said core, forming a working air gap, the armature having a valve closure member which controls a valve outlet as well as lower and upper guide surfaces by which it is guided in the valve housing, the lower guide surface being arranged close to the valve closure member.

Such injection valves are presently used in automobile engines and are therefore generally known.

In the known fuel-injection valve, the armature is guided via its two guide surfaces in a nozzle body and thus relatively far from the magnet winding. The nozzle body itself is guided in sealing fashion in an inner bore in the valve housing. Above the upper guide surface of the armature, the armature has considerable play on all sides with respect to the valve housing so that the armature cannot jam.

In the known injection valve, the magnetic flux between valve housing and the armature must take place, over a relatively large air gap below the magnet winding and in part far away from the magnet winding, from the valve housing via a guide to the nozzle body and from there via another guide to the armature. Due to this there are losses in magnetic flux which must be taken into consideration when dimensioning the magnet winding and the armature. In order to obtain a fuel-injection valve which has as little inertia as possible and is therefore rapid-acting, it is, however, desirable to use an armature which is as low in weight as possible.

SUMMARY OF THE INVENTION

It is an object of the invention to develop a fuel-injection valve of the aforementioned type which can open and close in the fastest possible tempo.

According to the invention, the upper guide surface (12) is arranged directly below the magnet winding (2) and is guided there within a guide bore (15) in the valve housing (1).

As a result of this development the magnetic flux takes place directly below the magnet winding from the valve housing via only a single guide to the armature of the fuel-injection valve. In this way the losses of magnetic flux are very slight so that the fuel-injection valve can be equipped with an armature of low weight. In this way it becomes less heavy than the armature of comparable fuel-injection valves and can thus move faster between the two stroke positions. The lower losses of the magnetic flux between the valve housing and the armature make it possible to make the working air gap slightly larger so that, even in the case of unfavorable tolerances, there is no danger of the fuel amount passed by the valve changing with a change in the stroke.

The upper guidance of the armature may suitably take place in the manner that the valve housing (1) is provided, directly below the magent winding (3), with an inwardly facing annular disk (14) within which the guide bore (15) is provided coaxial to the soft-iron core (2).

The limiting of the opening stroke of the armature can be effected with little expense in the manner that a flange-like outward-directed stop collar (19) which is movable from below against the annular disk (14) is provided on the armature (7) below the annular disk (14).

Another particularly advantageous embodiment of the invention consists in developing the soft-iron core (2) as a screw part whose armature-side end surface (4) forms a limitation of the working air gap and which is arranged axially displaceable within the valve housing (1).

The magnet winding can be cooled by the return flow of fuel necessary in fuel-injection valves if, in accordance with another embodiment of the invention, at least one axial passageway (16) leading to the magnet winding (3) is provided in the annular disk (14) and the valve housing (1) has a return flow outlet (17) at the level of the upper end of the magnet winding (3). The fuel in the fuel-injecton valve can pass in part also into the upper guide and produce a lubricating action there.

The fuel passes on a short path to the fuel outlet if a fuel-inlet opening (18) is provided below the annular disk (14) of the valve housing (1).

The lower guide of the armature can also be produced at little expense if the lower guide surface (13) of the armature (17) is guided by a guide member (22) which is seated, sealing towards the outside, in a coaxial inner bore (23) of the valve housing (1) which is open towards the bottom.

The closing position of the valve closure member can be adjusted independently of the residual air gap if a spacer disk (26) is arranged between an upper face surface (25) of the guide member (22) and a shoulder (27) of the valve housing (1) which is directed towards the outlet (31) of the injection valve and if the valve seat (11) is provided on the guide member (22).

The guide member (22) itself is preferably held by a nozzle body (24) in the inner bore (22).

The invention permits of numerous embodiments.

BRIEF DESCRIPTION OF THE DRAWING

With the above and other objects in view, the invention will be described by example referring to the sole FIGURE which is a longitudinal section through a region concerning the invention of a fuel-injection valve according to the invention.

DETAILED DESCRIPTION OF THE PREFERRED EMBODIMENT

The fuel-injection valve shown has a valve housing 1 in which a magnet winding 3 is provided around a soft-iron core 2. The soft-iron core 2 is a screw part which is screwed from above by threads 26 into the valve housing 1 and the axial position of which can be varied by screwing it in to a greater or lesser depth. The lower face surface 4 of the soft-iron core 2 forms an upper limitation of a working air gap 5 which is limited towards the bottom by an upper face surface 6 of an armature 7. The armature 7 in this embodiment consists of a core 7a and a bushing 7b pushed onto it. A compression spring 9 which rests in a longitudinal borehole 8 in the soft-iron core 2 has its other end resting against the armature 7. In this way the armature 7 is urged downward.

On its lower end, as seen in the drawing, the armature 7 has a valve closure member 10 which, in the position shown, rests tightly on a valve seat 11. The guidance of the armature 7 is of importance for the invention. Directly below the magnet winding 3 the armature has an upper guide surface 12 and, above the valve closure member 10, a lower guide surface 13. Within the region of the upper guide surface 12, the valve housing 1 has a downward directed annular disk 14 with a coaxial guide borehole 15 in which the guide surface 12 is guided. The magnetic flux can thereby extend from the valve housing 1 via the annular disk 14 into the armature 7 and, from there, via the working air gap 5 to the soft-iron core 2.

The fuel enters the fuel-injection valve via a fuel inlet opening 18. A partial stream flows over an axial passage 16 within the annular disk 14 or a plurality of passages to the magnet winding 3 and leaves the fuel-injection valve via a return-flow outlet 17 on the upper end of the magnet winding 3. In this way the magnet winding 3 is continuously cooled by the fuel.

Below the annular disk 14 an outwardly directed stop collar 19 is provided on the armature 7, said collar being able to place itself against a lower face surface 20 of the annular disk 14, thereby limiting the maximum possible upward stroke of the armature 7.

The lower guide surface 13 of the armature 7 is guided in a guide borehole 21 of a guide member 22. The latter is seated in sealing manner within an inner borehole 23 of the valve housing 1 and is held in said inner bore 23 by a nozzle member 24 which is seated below the guide member 22 in the inner borehole 23. The guide member 22 is provided on its lower side with the valve seat 11 on which the valve closure member 10 seats itself. Towards the top, an upper face surface 25 of the guide member 22 rests against a spacer ring 26 which in its turn rests against a shoulder 27 of the valve housing 1. By means of spacer rings 26 of different thickness the position of the valve seat 11 relative to the valve housing 1 can be changed without the residual air slot 5 being thereby changed.

For a further understanding of the fuel-injection valve it may also be pointed out that the fuel which enters via the fuel inlet opening 18 first passes into a valve chamber 28 and from there via boreholes 29 within the guide member 22 to the valve closure member 10. When the valve closure member 10 is open, the fuel can then pass through the valve seat 11 and a valve plate 30 to an outlet 31. Oblique boreholes 32, 33 in the valve plate 30 forces the fuel to leave the fuel-injection valve with a swirl.

We claim:

1. An electromagnetically actuatable fuel-injection valve for injection systems of internal-combustion engines, comprising a valve housing wth a fixed magnet winding, a soft-iron core disposed within the valve housing and surrounded by the magnet winding; and an armature which is arranged coaxially with and facing said core, there being a working air gap between the core and the armature permitting displacement of the armature, the armature comprising a valve closure element which controls an outlet of the valve, the armature including upper and lower guide surfaces for guiding the armature within the valve housing, the lower guide surface being located close to the valve closure element; and wherein the valve housing has a guide bore, and the upper guide surface of the armature is located directly below the magnet winding and is guided within the guide bore of the valve housing; the valve further comprising a guide element which is seated, sealing towards the valve outlet, in a coaxial inner bore of the valve housing which is open towards the valve outlet; and wherein said lower guide surface of the armature is guided by said guide element; the valve further comprising a spacer disk located between an upper face surface of the guide element and a shoulder of the valve housing, which shoulder is directed towards the outlet of the injection valve, there being a valve seat provided on the guide element for receiving said valve closure element.

2. An electromagnetically actuatable fuel-injection valve according to claim 8, wherein the valve housing is provided, directly below the magnet winding, with an inwardly facing annular disk within which the guide bore is disposed coaxially to the soft-iron core.

3. An electromagnetically actuatable fuel-injection valve according to claim 2, wherein said armature comprises a flange-like outward directed stop collar which is displaceable against the annular disk on a side thereof facing the valve outlet, upon movement of said armature.

4. An electromagnetically actuatable fuel-injection valve according to claim 1, wherein said soft-iron core is formed as a screw part having an armature-side end surface which limits the working air gap, said core being axially displaceable upon rotation of the core within the valve housing.

5. An electromagnetically actuatable fuel-injection valve according to claim 2, wherein at least one axial passageway leading to the magnet winding is provided in said annular disk and the valve housing, said passageway including a return flow outlet at an upper end of the magnet winding.

6. An electromagnetically actuatable fuel-injection valve according to claim 2, further comprising a fuel-inlet opening located below said annular disk of the valve housing.

7. An electromagnetically actuatable fuel-injection valve according to claim 1, further comprising a nozzle body in said inner bore; said guide element being held by said nozzle body.

* * * * *